United States Patent
Maddox (10) Patent No.: US 7,182,091 B2
(45) Date of Patent: Feb. 27, 2007

(54) HUNTING BLIND AND METHOD OF USE THEREOF

(76) Inventor: Clarence Lee Maddox, 4498 Doyle St., Tucker, GA (US) 30084

( * ) Notice: Subject to any disclaimer, the term of this patent is extended or adjusted under 35 U.S.C. 154(b) by 176 days.

(21) Appl. No.: 10/886,404

(22) Filed: Jul. 7, 2004

(65) Prior Publication Data

US 2006/0005870 A1   Jan. 12, 2006

(51) Int. Cl.
*A45H 15/04* (2006.01)
(52) U.S. Cl. .......................... 135/90; 135/96; 135/901; 182/187; 182/135; 43/1
(58) Field of Classification Search ................ 135/901, 135/90, 96, 117; 182/187, 135; 43/1; 248/230.8, 248/218.4
See application file for complete search history.

(56) References Cited

U.S. PATENT DOCUMENTS

| | | | | |
|---|---|---|---|---|
| 3,116,808 A | * | 1/1964 | Riley | 182/187 |
| 4,134,474 A | * | 1/1979 | Stavenau et al. | 182/187 |
| 4,505,286 A | * | 3/1985 | Madion | 135/90 |
| 5,630,439 A | * | 5/1997 | Hutto | 135/90 |
| 5,669,403 A | * | 9/1997 | Belcher et al. | 135/90 |
| 6,086,031 A | * | 7/2000 | Renfro | 248/218.4 |
| 6,170,609 B1 | * | 1/2001 | Dech | 182/187 |
| 6,243,979 B1 | * | 6/2001 | Seats et al. | 42/94 |
| 6,434,877 B1 | * | 8/2002 | Shelton | 43/1 |
| 6,499,496 B1 | * | 12/2002 | Young | 135/90 |
| 6,588,440 B2 | * | 7/2003 | Varnado | 135/90 |

\* cited by examiner

*Primary Examiner*—Winnie Yip
(74) *Attorney, Agent, or Firm*—Myers & Kaplan, LLC; Sandra Drummond, Esq.; Joel D. Myers, Esq.

(57) ABSTRACT

A hunting blind and method of use thereof, comprising a cylindrical mount having a tube disposed therethrough. The cylindrical mount attaches to a tree or other suitable object via straps, bungee cords and/or a hook. The tube comprises angled holes into which support tubes supporting screen panels are inserted. The support tubes are sectioned so as to enable disassembly for packing into a compact arrangement by rolling up same within the screen panels. The screen panels have extensions that can be secured together via cords. Alternate embodiments are directed to the addition of a mesh panel above the screen panels and extensions; a ground-based stand, wherein the screen panels and extension are secured to the ground via tent stakes; and a wheelchair stand, wherein a framework on the wheelchair carries the support tubes, panels and extensions of the preferred embodiment.

19 Claims, 7 Drawing Sheets

HUNTING BLIND AND METHOD OF USE THEREOF

TECHNICAL FIELD

The present invention relates generally to hunting blinds, and more specifically to a hunting blind and method of use thereof, wherein the hunting blind may be quickly assembled and disassembled for ease of portability, and wherein the hunting blind can be utilized in conjunction with a tree stand, or upon a ground surface.

BACKGROUND OF THE INVENTION

A hunter in the field must often sit, stand or lie in a quiet position on the ground or in a tree in order to observe and harvest game animals, and so as to not make visible or audible disturbances that could frighten same. Accordingly, many hunters set up a 'blind'; that is, a screened area that blends in with the environment, but from which a hunter can still observe his surroundings.

In addition to hunters, soldiers involved in field operations will often require camouflaged positions. In particular, such positions are selected high in trees or other structures in order to provide a vantage point for an observer or for a sniper.

For both hunters and soldiers, the basic requirements of portability, silence, minimal motion and minimal effort are desired in any device utilized for screening the hunter or soldier visually.

As such, various devices have been employed for the purpose of helping the hunter to blend in with his surroundings, to dampen slight sounds, and to provide a measure of protection from the elements. Early devices included buildings, trenches and the like. More recently, hunters have utilized fabric materials that can be installed over their tree stands, ground stands, or freely stand upon the ground. Typical such fabric materials carry a camouflage pattern thereon to facilitate blending into the scenery, thereby reducing the likelihood of game noticing and/or observing the hunter.

Moreover, hunters move from location to location following game trails or choosing better locations from which to observe their surroundings. Furthermore, it is desirable that a departing hunter avoid leaving behind any devices that could litter the environment. Accordingly, a hunter will typically transport the materials suitable for providing a blind around a selected location.

Devices that have been utilized as blinds include garments that extend to cover the hunter's head, body and feet, and which continue on over the ground to better blend in. Often, such a garment will have a facility for passage of the hunter's arms or of a weapon therethrough; thereby enabling the hunter to be in a ready position to acquire targeted game. However, although such devices are portable, most are suitable for single-person use only, and, due to bulkiness, can foul on tree limbs when climbing. Other devices utilized include screens or tent-like devices having support frames, wherein such frames are typically rigid or flexible poles that may be engaged to form a support structure. However, such devices inherently require the user to carry a plurality of rather thick and long poles necessary for construction of the support structure.

Still other devices have utilized telescoping poles for overall construction. However, such devices suffer from similar disadvantages, in that the poles are often of large diameter (greater than a half inch), and typically heavy and too cumbersome for convenient transport. This is particularly problematic for a hunter who must climb a tree and, with a minimum amount of motion and noise, assemble his/her blind around a tree stand.

Therefore, it is readily apparent that there is a need for a portable hunting blind that is lightweight and which can be easily and quietly assembled and disassembled with a minimum amount of movement.

BRIEF SUMMARY OF THE INVENTION

Briefly described, in a preferred embodiment, the present invention overcomes the above-mentioned disadvantages and meets the recognized need for such a device by providing a hunting blind and method of use thereof, wherein the hunting blind is lightweight, readily and easily transportable, and which can be put up and taken down with a minimum of visible and/or audible disturbance.

According to its major aspects and broadly stated, the present invention in its preferred form is a hunting blind and method of use thereof, wherein the hunting blind comprises a securing device for mounting screen panels and support tubes to a tree or similar structure. The hunting blind is securable to a tree or other object and/or can be utilized as a ground blind, tree blind or wheelchair blind.

More specifically, the present invention is a hunting blind and method of use thereof, wherein the hunting blind comprises a semi-cylindrical mount having a tube disposed therethrough, and wherein the cylindrical mount attaches to a tree or other suitable object via straps, bungee cords and/or a hook. The tube includes angled holes into which support tubes carrying screen panels are inserted. The support tubes are sectioned so as to enable disassembly for packing into a compact arrangement by rolling up same within the screen panels. The screen panels have extensions that are not supported by the support tubes, but rather are secured together via cords. Under tension of the secured extensions, which are flexibly attached to the screen panels, the support tubes distort into a bow shape. As such, the screen panels and extensions extend downward, covering the hunter and the tree stand.

In an alternate embodiment, the present invention includes a mesh fabric above the screen panels and extensions. The mesh fabric provides improved visibility for the hunter. Additionally, a roof complements the hunting blind, thus obscuring the hunter from above.

Another alternate embodiment of the present invention is directed to a ground-based stand, wherein the screen panels and extension are secured to the ground via tent stakes or the like. An additional embodiment is directed to a wheelchair stand, wherein a framework on the wheelchair carries the support tubes, panels and extensions of the preferred embodiment.

Accordingly, a feature and advantage of the present invention is its ability to be readily assembled in the field with minimal noise and movement.

Another feature and advantage of the present invention is its ability to be altered to adjust to the present needs of a hunter by extending above the hunter's head.

Still another feature and advantage of the present invention is its ability to be attached to a tree or other fixed object and/or to a ground surface.

Yet another feature and advantage of the present invention is its light weight.

Yet still another feature and advantage of the present invention is its ability to provide screening from above to shelter a hunter from sunlight.

A further feature and advantage of the present invention is its compactness in a disassembled form.

These and other features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATIVE EMBODIMENTS

In describing the preferred and selected alternate embodiments of the present invention, as illustrated in FIGS. 1–8, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1–5B, the present invention in a preferred embodiment is hunting blind 10, wherein hunting blind 10 preferably comprises means for attaching 20, first screen panel 120, second screen panel 130, first panel extension 140, second panel extension 150, first support tube 160, and second support tube 170. Screen panels 120 and 130 and panel extensions 140 and 150 are comprised of lightweight material, such as, for exemplary purposes only, open-weave nylon and/or polyester. It will be recognized by those in that art that other lightweight materials could be utilized to form screen panels 120 and 130 and extension 140 and 150.

Support tubes 160 and 170 comprise strong, lightweight material, such as, for exemplary purposes only, fiberglass, plastic or lightweight metal, wherein a suitable plastic is polycarbonate, and wherein suitable metals are titanium, aluminum and steel. It will be recognized by those skilled in the art that other lightweight materials could be utilized without departing from the present invention.

Means for attaching 20, preferably comprises half cylinder 30, pipe 40, and belt 110. Half cylinder 30 preferably comprises belt restraint 190, wherein belt restraint 190 serves to removably retain belt 110 therein. Belt 110 serves to secure means for attaching 20 to tree T. It will be recognized that an alternative securing means than belt 110 could be selected, such as, for exemplary purposes only, "L"-shaped hook 114. In such an embodiment, "L"-shaped hook 114 could screw into tree T and engages aperture 195, and/or bungee cords 112, wherein bungee cords 112 could pass around tree T and hook ends 220 of bungee cords 112 could engage orifices 230, thereby securing means for attaching 20 to tree T.

Figure 5A:
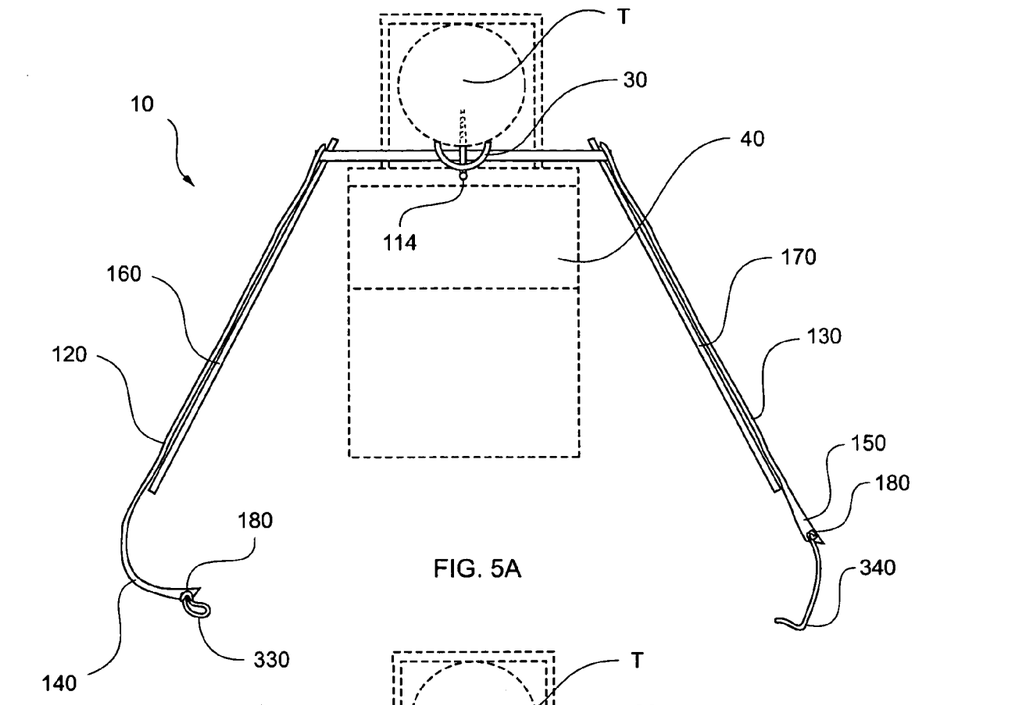
FIG. 5A is a top view of a hunting blind according to a preferred embodiment of the present invention, shown assembled in open form.
Figure 5B:
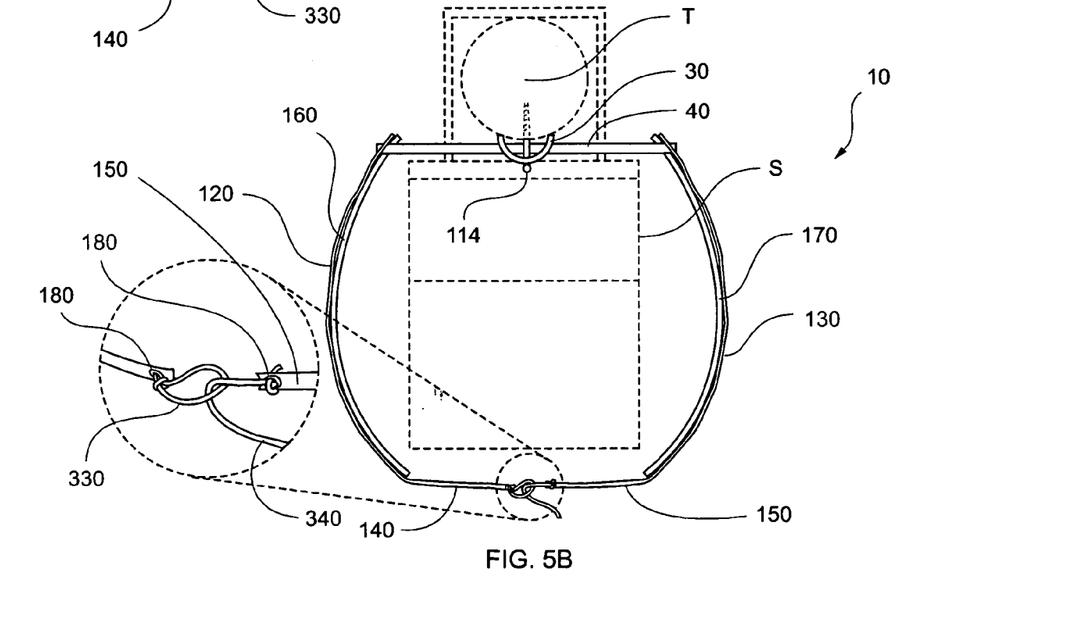
FIG. 5B is a top view of a hunting blind according to a preferred embodiment of the present invention, shown assembled in closed form.

Pipe 40 preferably comprises first extension 50 and second extension 60, wherein first extension 50 further preferably comprises first end 70 and second end 80, and wherein second extension 60 further preferably comprises first end 90 and second end 100. First end 70 of first extension 50 preferably carries first angled channel 200, and first end 90 of second extension 60 preferably carries second angled channel 210 (best shown in FIGS. 2, 5A and SB). First angled channel 200 and second angled channel 210 are preferably adapted to receive first support tube 160 and second support tube 170, respectively. First angle channel 200 and second angled channel 210 preferably position first support tube 160 and second support tube 170 at an approximately ninety degree angle from one another, wherein first support tube 160 and second support tube 170 preferably extend outwardly from tree T (best shown in FIG. 5A).

Figure 1:
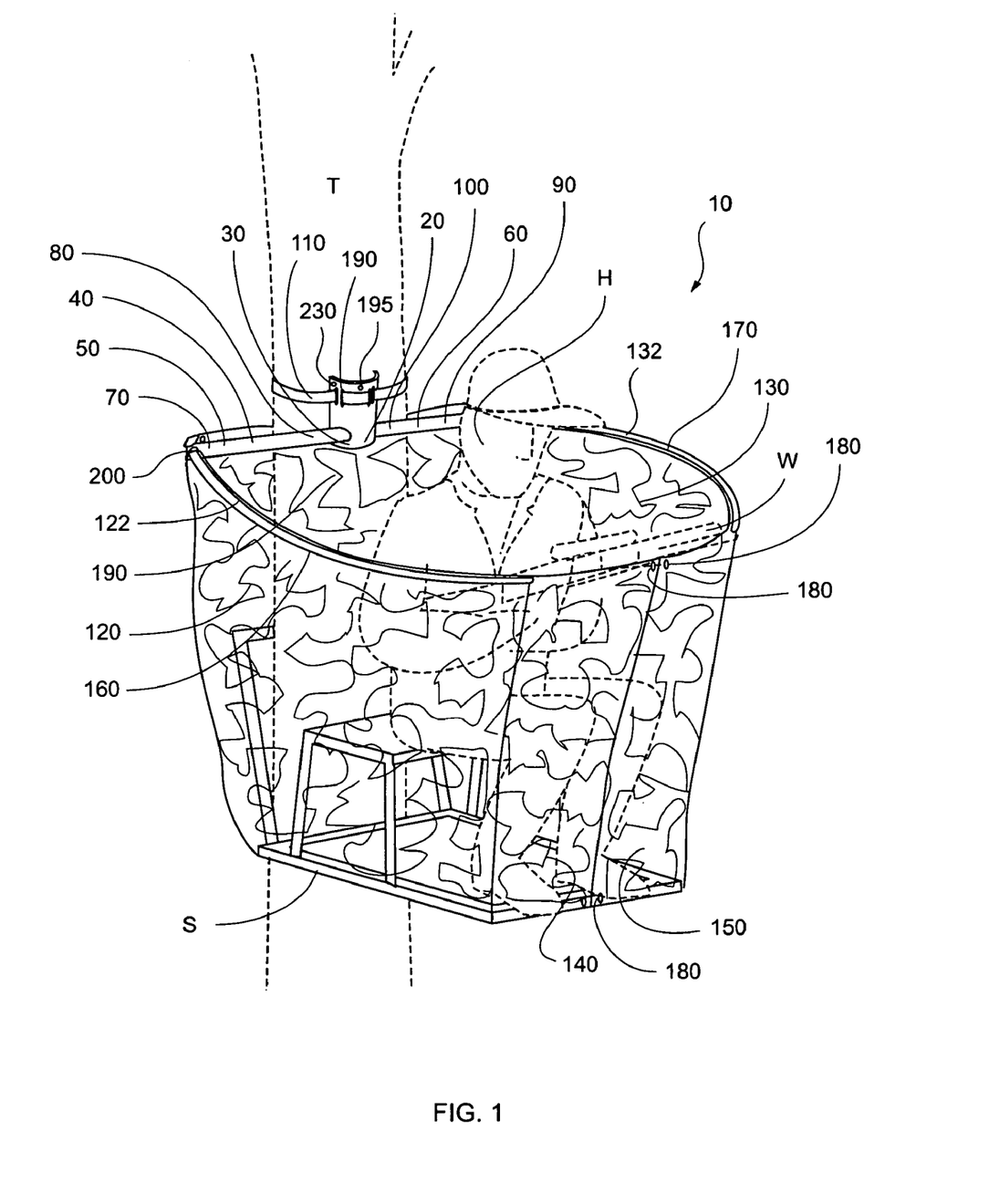
FIG. 1 depicts a perspective view of a hunting blind according to a preferred embodiment of the present invention, shown in use over a tree stand.

First support tube 160 and second support tube 170 preferably support first screen panel 120 and second screen panel 130 respectively, wherein first screen panel 120 and second screen panel 130 preferably drape downward shielding hunter H and tree stand S from side view. Camouflage pattern 155 on screen panels 120 and 130 preferably facilitates obscuring hunter H, tree stand S and hunting blind 10 from visual observation by game. Additionally, screen panels 120 and 130 can comprise leaf-shaped cuts 165 to further blend in with surrounding flora. Top 122 of first screen panel 120 and top 132 of second screen panel 130 preferably have sleeves 145 formed therein, wherein sleeves 145 are formed by any suitable means, such as, for exemplary purposes only, folding tops 122 and 132 over tubes 160 and 170, respectively, and preferably securing same with stitching 147.

First screen panel 120 and second screen panel 130 further preferably comprise first panel extension 140 and second panel extension 150 affixed respectively thereto. Panel extension 140 and 150 are preferably unsupported by first support tube 160 and second support tube 170, respectively, and are preferably capable of being pulled together and secured via a suitable tying means passing through grommets 180. One such suitable tying means preferably comprises tie loop 330 and cord 340, wherein cord 340 can preferably be fastened through grommet 180 on second panel extension 150 and tie loop 330 can preferably be fastened through grommet 180 on first panel extension 140, and wherein cord 340 can preferably be tied through tie loop 330, thereby securing first panel extension 140 and second panel extension 150 together. Under tension from first panel extension 140 and second panel extension 150, first support tube 160 and second support tube 170 are preferably forcefully and resiliently drawn together to form a bowed structure (best shown in FIG. 5B). In such a fashion, first panel extension 140 and second panel extension 150 preferably shield hunter H and tree stand S from frontal exposure.

Figure 4A:
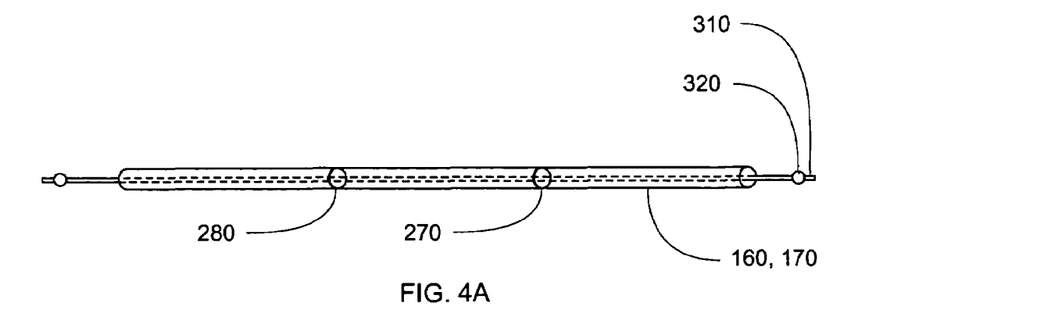
FIG. 4A shows a support tube component of a hunting blind according to a preferred embodiment of the present invention.
Figure 4B:
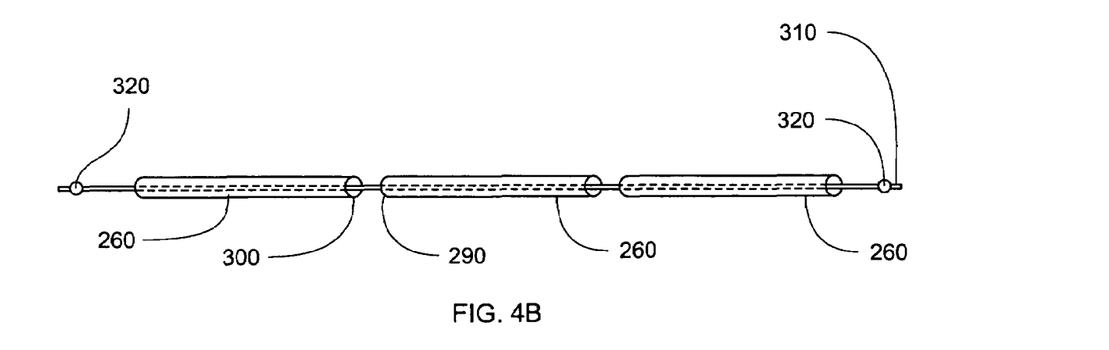
FIG. 4B shows the support tube of FIG. 4A according to a preferred embodiment of the present invention, shown partially disassembled.
Figure 4C:
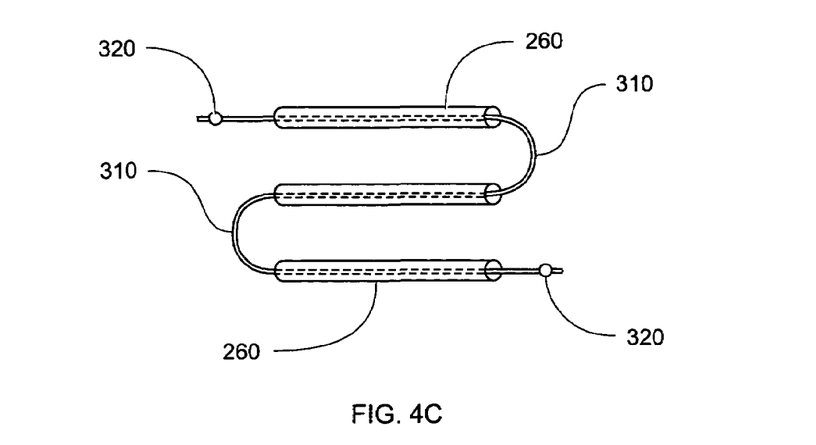
FIG. 4C shows the support tube of FIG. 4B according to a preferred embodiment of the present invention, shown folded.

Support tubes 160 and 170 preferably comprise tube segments 260, first joint 270, second joint 280, elastic cord 310 and knot 320, wherein joints 270 and 280 further preferably comprise inner sleeves 290 and outer sleeves 300, as best shown in FIGS. 4A–4C. Inner sleeves 290 preferably engage outer sleeves 300 to form support tubes 160 and 170, wherein support tubes 160 and 170 can be collapsed for ease of transport. Elastic cord 310 preferably retains tube segments 260 together, and knot 320 preferably prevents elastic cord from being removed from tube segments 260.

Figures 2, 3:
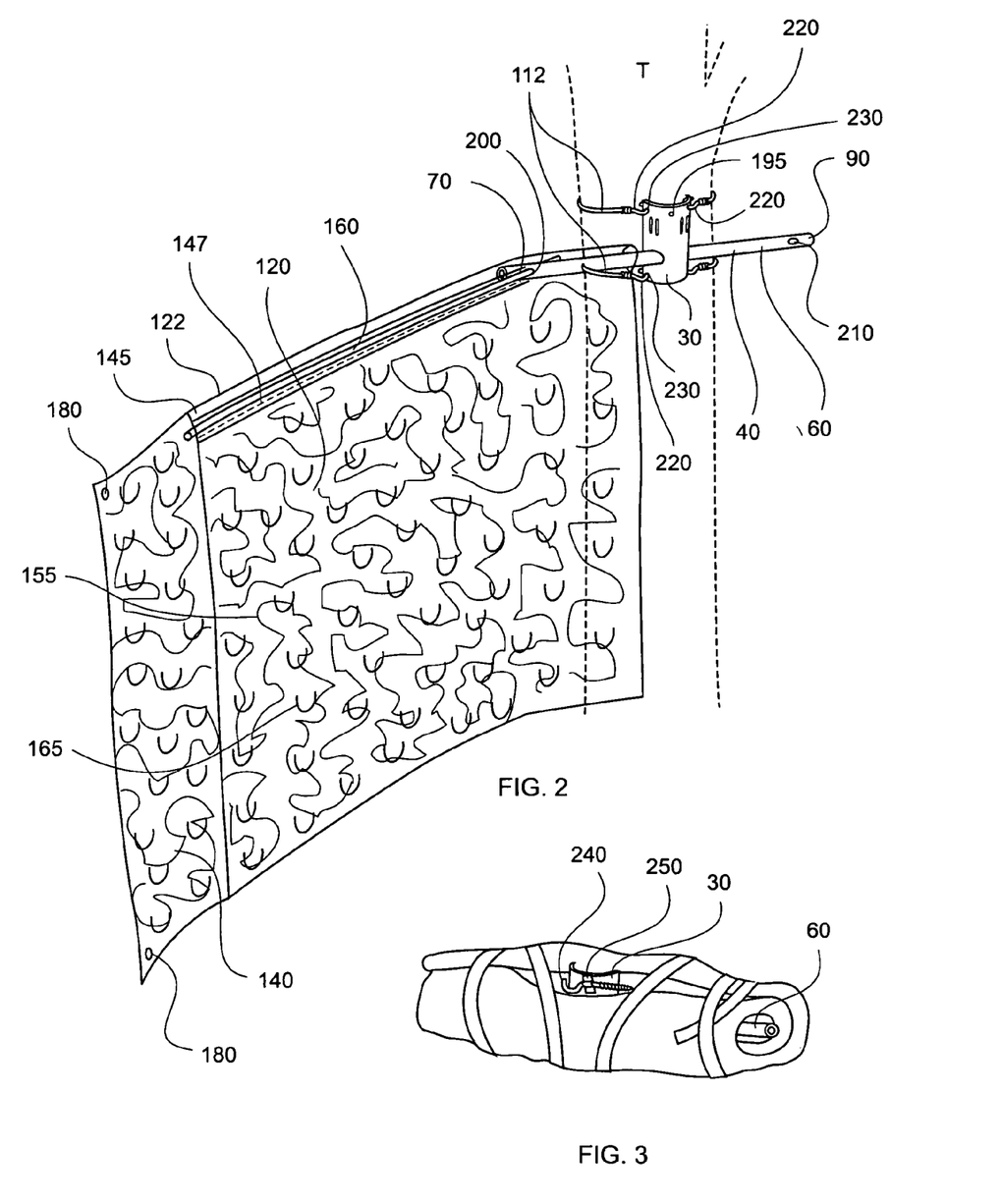
FIG. 2 depicts a perspective view of a partially-assembled hunting blind according to a preferred embodiment of the present invention during assembly.
FIG. 3 depicts a perspective view of a hunting blind according to a preferred embodiment of the present invention, shown rolled up and ready for transport.

Referring now more specifically to FIG. 3, in order to transport apparatus 10, support tubes 160 and 170 are disassembled and folded together, as best shown in FIG. 4C, and screen panels 120 and 130 and panel extensions 140 and 150 are rolled around support tubes 160 and 170, and around means for attaching 20. Belt 110 is subsequently wrapped around the resulting package and secured. Bungee cords 112, "L"-shaped hook 114 and/or screw hook 240 are retained with means for attaching 20 via fastener 250, such as, for exemplary purposes only, tape. Alternately, a pouch could be utilized to retain component pieces such as "L"-shaped hook 114, screw hook 240 and/or tent stakes 520 therewithin.

In operation, hunter H preferably mounts tree stand S, and means for attaching 20 is preferably selectively secured to tree T via belt 110, bungee cords 112 or "L"-shaped hook 114. Support tubes 160 and 170, while remaining within sleeves 145, are preferably assembled and inserted into first angled channel 200 and second angled channel 210, respectively. Cord 340 is preferably secured to tie loop 330, thereby enclosing hunter H, within hunting blind 10. Hunter H can selectively shoot weapon W through screen panels 120 and/or 130, panel extensions 140 and/or 150, and/or extend weapon W out from between panel extensions 140 and 150, and/or through leaf-shaped cuts 165. Upon completion of use, hunter H releases cord 340, enabling un-bowing of support tubes 160 and 170, thereby facilitating disassembly.

Figure 6:
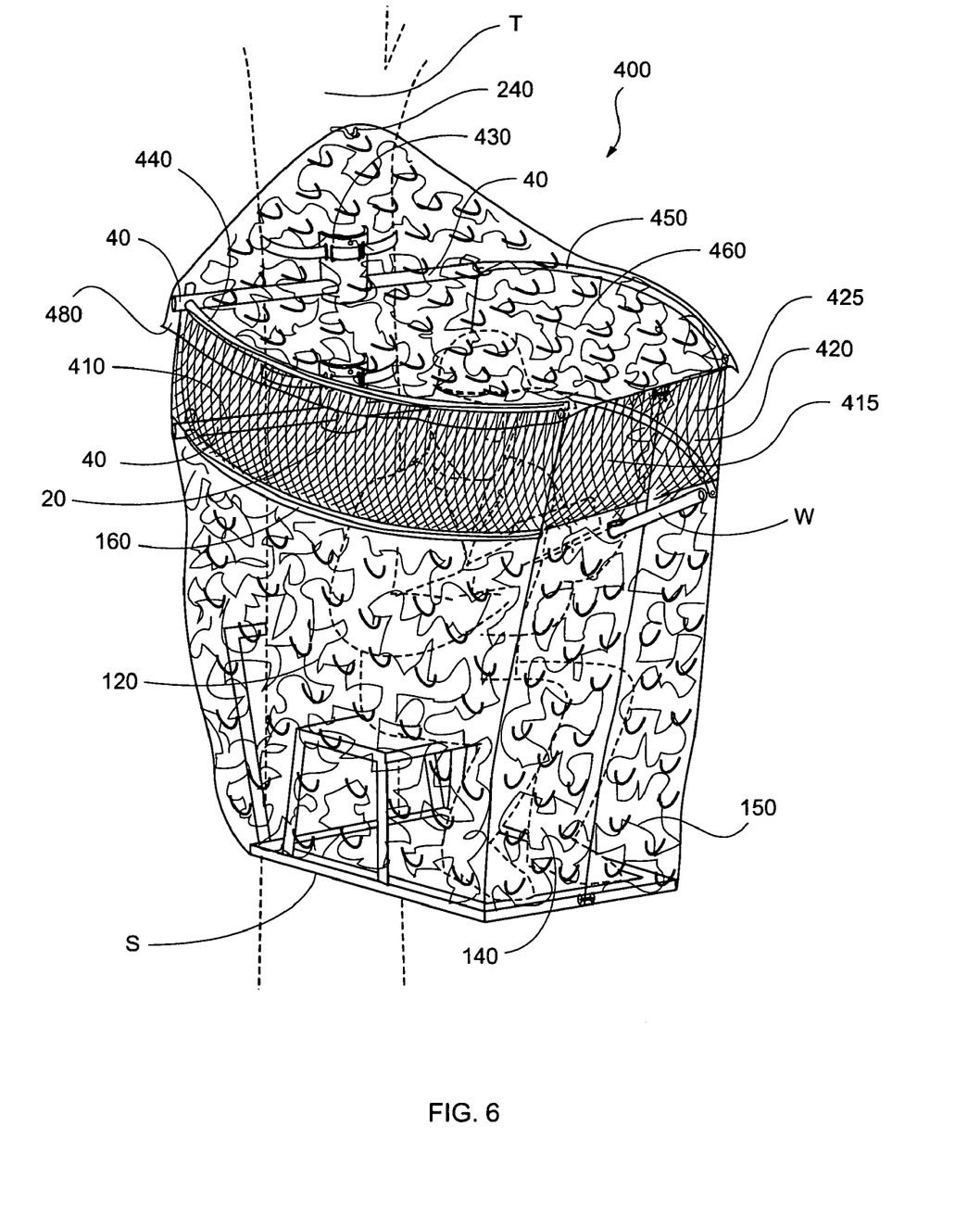
FIG. 6 is a perspective view of a hunting blind according to an alternate embodiment of the present invention.

Referring now more specifically to FIG. 6, illustrated therein is an alternate embodiment of hunting blind 10, wherein the alternate embodiment of FIG. 6 is substantially equivalent in form and function to that of the preferred embodiment detailed and illustrated in FIGS. 1–5B except as hereinafter specifically referenced. Specifically, the embodiment of FIG. 6 comprises extended hunting blind 400, wherein extended hunting blind 400 comprises means for attaching 20, support tubes 160 and 170, and wherein support tubes 160 and 170 support screen panels 120 and 130, respectively.

Hunting blind 400 further comprises first mesh panel 410 and second mesh panel 420 carried by first upper support tube 440 and second upper support tube 450, respectively. Mesh panels 410 and 420 are comprised of lightweight material, such as, for exemplary purposes only, open-weave nylon and/or polyester. It will be recognized by those in that art that other lightweight materials could be utilized to form mesh panels 410 and 420.

First upper support tube 440 and second upper support tube 450 are carried by upper means for attaching 430, wherein upper means for attaching 430, and support tubes 440 and 450, are substantially the same as means for attaching 20, and support tubes 160 and 170, respectively. Upper means for attaching 430 is disposed above means for attaching 20, wherein mesh panels 410 and 420 are disposed above and drape over support tubes 160 and 170, thereby providing improved vision for hunter H for viewing game through mesh panels 410 and 420. Gap 470 is formed by mesh panels 410 and 420 draping over support tubes 160 and 170 supporting screen panels 120 and 130, wherein gap 470 facilitates hunter H inserting weapon W therethrough. Hunting blind 400 can further comprise roof 460, wherein roof 460 is secured over screw hook 240 following insertion of screw hook 240 into tree T. Corners 480 and 490 (not shown) of roof 460 can be secured to first end 70 of first extension 50 and first end 90 of second extension 60, respectively. Roof 460 is subsequently extended sideways over first upper support tube 440 and second support tube 450, and forward over first mesh extension 415 and second mesh extension 425.

Figure 7:
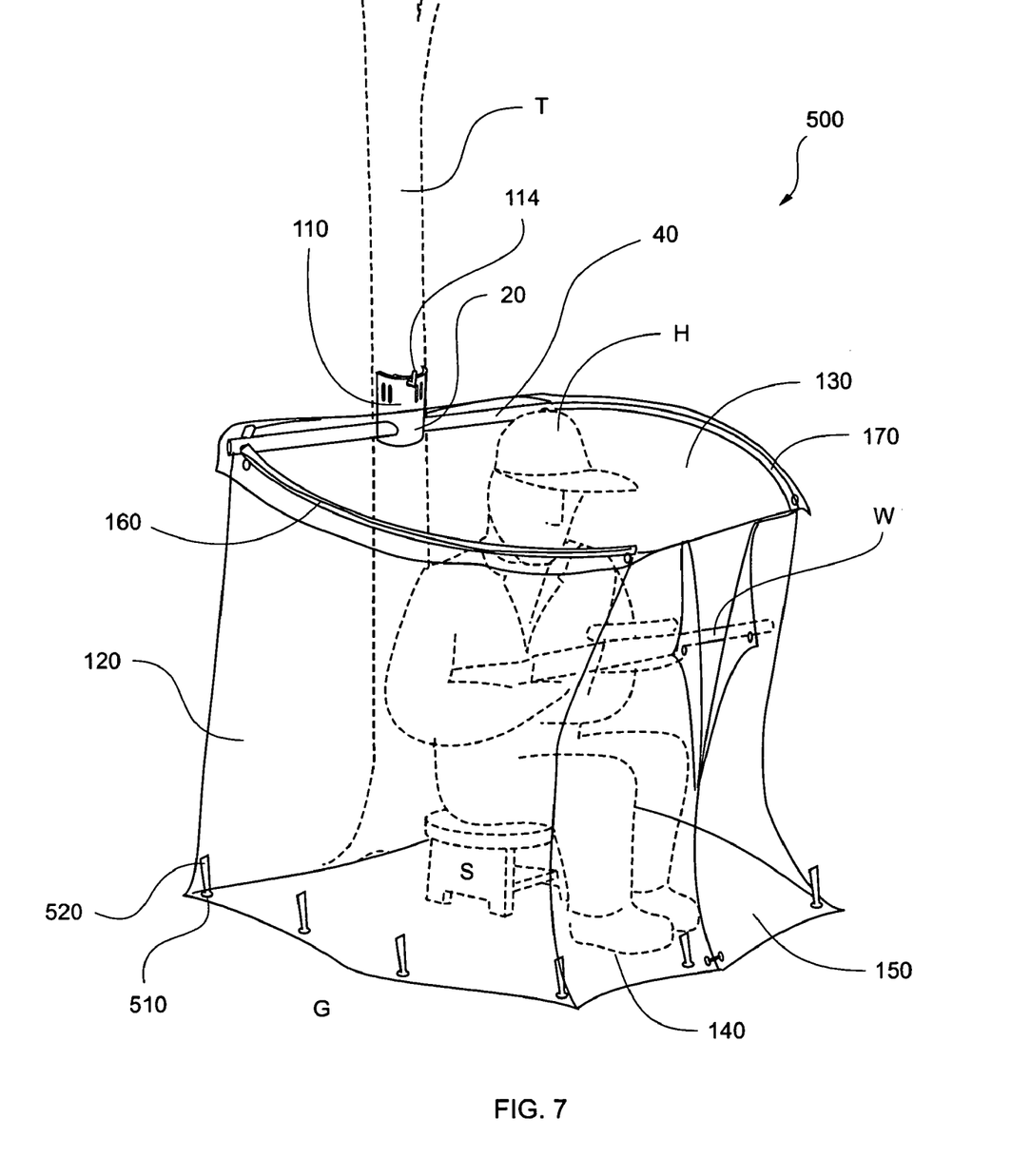
FIG. 7 is a perspective view of a hunting blind according to an alternate embodiment of the present invention.

Referring now more specifically to FIG. 7, illustrated therein is an alternate embodiment of hunting blind 10, wherein the alternate embodiment of FIG. 7 is substantially equivalent in form and function to that of the preferred embodiment detailed and illustrated in FIGS. 1–5B except as hereinafter specifically referenced. Specifically, the embodiment of FIG. 7 comprises ground hunting blind 500, wherein ground hunting blind 500 comprises means for attaching 20, first screen panel 120 supported by first support tube 160 and second screen panel 130 supported by second support tube 170. Means for attaching 20 is secured to small tree T, or other vertical post, via "L"-hook 114. First screen panel 120 and second screen panel and 130 further comprise first panel extension 140 and second panel extension 150, respectively. First support tube 160 and second support 170 are supported and aligned slightly outwardly by pipe 40.

First screen panel 120, second screen panel 130, first panel extension 140 and second panel extension 150 comprise stake grommets 510, wherein panels 120 and 130, and extensions 140 and 150 can be secured to ground G via insertion of tent stakes 520 through stake grommets 510.

In use, hunter H awaits game within ground hunting blind 500, while seated on stool S. Weapon W can be extended between extension 140 and 150, and/or can be selectively fired through panels 120 and 130 or through extensions 140 and 150.

Figure 8:
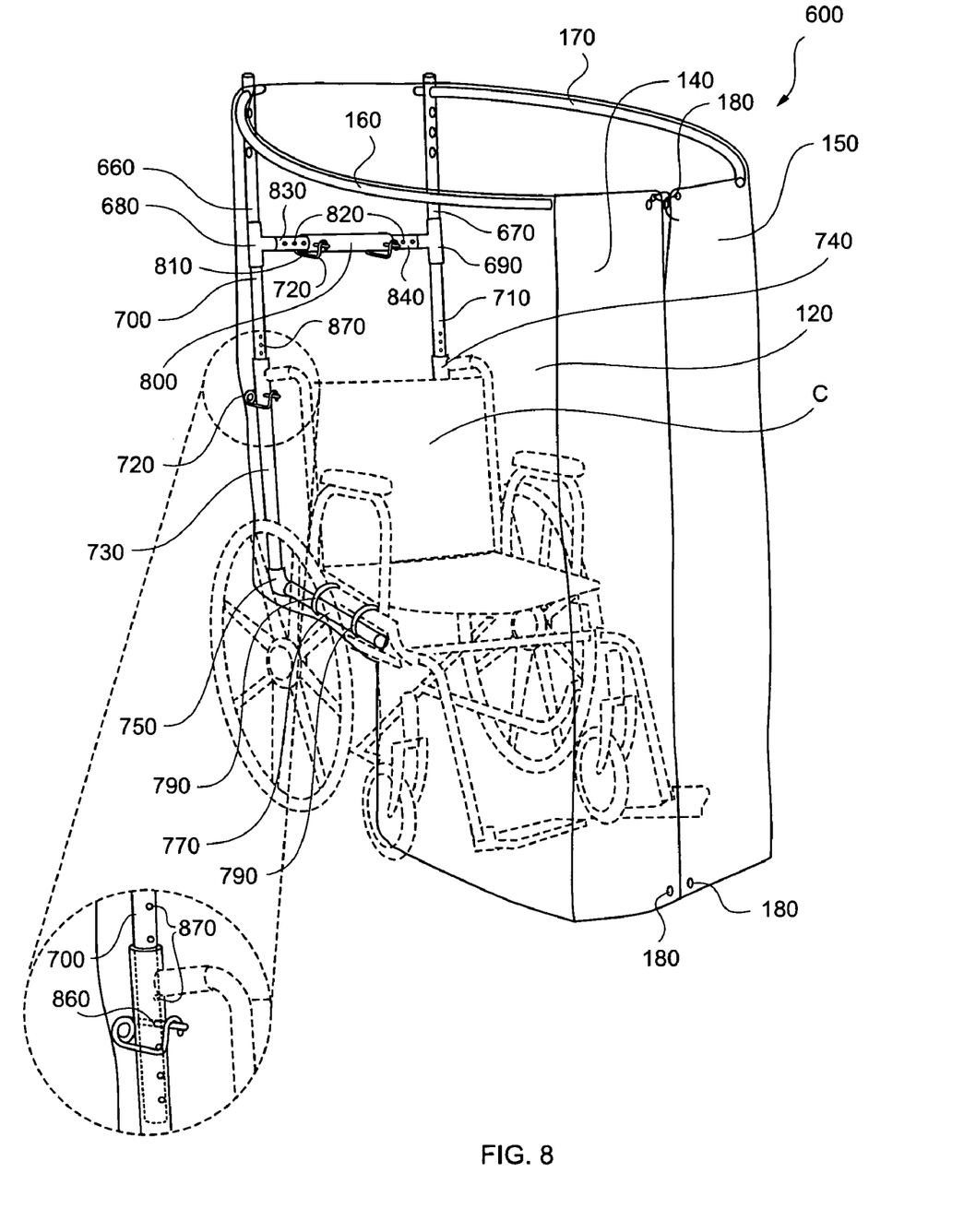
FIG. 8 is a perspective view of a hunting blind according to an alternate embodiment of the present invention.

Referring now more specifically to FIG. 8, illustrated therein is an alternate embodiment of hunting blind 10, wherein the alternate embodiment of FIG. 8 is substantially equivalent in form and function to that of the preferred embodiment detailed and illustrated in FIGS. 1–5B except as hereinafter specifically referenced. Specifically, the embodiment of FIG. 8 comprises wheelchair hunting blind 600, wherein wheelchair hunting blind 600 comprises first upper riser 660 and second upper riser 670, wherein first upper riser 660 and second upper riser 670 have channels 665 disposed thereon, and wherein channels 665 are adapted to angularly receive first support tube 160 and second support tube 170.

First upper riser 660 is fixably secured to first tee joiner 680. Similarly, second upper riser 670 is fixably secured to second tee joiner 690. First lower riser 700 is fixably secured to first tee joiner 680 and second lower riser 710 is fixably secured to second tee joiner 690.

First lower riser 700 slidably engages first frame tube 730 and second lower riser 710 slidably engages second frame tube 740. Frame tubes 730 and 740 comprise holes 860, and lower risers 700 and 710 comprise apertures 870. Lower risers 700 and 710 can be selectively extended or contracted by sliding within frame tubes 730 and 740, respectively, and secured in a selected position via clips 720, wherein clips 720 pass through holes 860 and apertures 870 of respective frame tubes 730 and 740 and lower risers 700 and 710.

First angled joiner 750 and second angled joiner 760 are fixably secured to first frame tube 730 and second frame tube 740, respectively. First angled joiner 750 and second angled joiner 760 are further fixably secured to first arm 770 and second arm 780 (not shown), respectively.

First tee joiner 680 is fixably attached to first extension 830 and second tee joiner 690 is fixably secured to second extension 840, wherein first and second extensions 830 and 840 are secured together via sleeve 800. First and second extensions 830 and 840 comprise throughholes. 820 disposed therethrough. Sleeve 800 comprises apertures 810 disposed therethrough. First and second tee joiners 680 and 690 can be selectively adjusted by sliding same together or apart and securing same in position via inserting clip 720 through holes 820 and aperture 810.

Wheelchair hunting blind 600 is secured to wheelchair C by removably attaching first arm 770 and second arm 780 via straps 790 to frame of wheelchair C. The height of wheelchair hunting blind 600 is selectively adjusted by sliding first lower riser 700 and second lower riser 710, and securing same within first frame tube 730 and 740, respectively, via clips 720. The width of wheelchair hunting blind 600 is selectively adjusted by sliding first extension 830 and second extension 840 within sleeve 800 and securing extensions therewithin via clips 720.

First support tube 160 and second support tube 170 are supported and aligned slightly outwardly by first upper riser 660 and second upper riser 670, respectively. First screen panel 120 and second screen panel 130, together with first panel extension 140 and second, panel extension 150, respectively, are supported by first support tube 160 and second support tube 170, respectively. Operation of wheelchair hunting blind 600 is carried out in the fashion described hereinabove for the preferred embodiment.

It is envisioned in an alternate embodiment of the present invention that first extension 50 and second extension 60 could be removable secured to pipe 40.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A hunting blind comprising:
   means for securing said hunting blind to a fixed vertical object;
   a mount, said mount carried by said means for securing, wherein said mount is removably secured to the fixed vertical object via said means for securing;
   a pipe member, said pipe member carried by said mount, extending bi-directionally and outwardly from said mount, and in an axially transverse relationship thereto;
   at least one flexible support tube comprising at least one tube segment, wherein said at least one support tube is carried by said pipe member; and
   at least one screen carried by said at least one support tube.

2. The hunting blind of claim 1, wherein said means for securing is selected from a group consisting of at least one bungee cord, at least one strap, at least one hook, and combinations thereof.

3. The hunting blind of claim 1, wherein said means for securing is at least one "L"-shaped hook.

4. The hunting blind of claim 1, wherein said at least one screen comprises a camouflage pattern thereon.

5. The hunting blind of claim 1, wherein said at least one screen comprises at least one lower screen portion and at least one upper screen portion.

6. The hunting blind of claim 1, wherein said at least one screen comprises a first screen panel and a second screen panel, and wherein said first screen panel comprises a first panel extension, and said second screen panel comprises a second panel extension.

7. The hunting blind of claim 6, wherein said first screen panel and said second screen panel are carried by said at least one flexible support tube, and wherein said first panel extension and said second panel extension are flexibly attached to said first screen panel and said second screen panel, respectively.

8. The hunting blind of claim 6, wherein said first panel extension and said second panel extension are adapted to be removably secured together.

9. The hunting blind of claim 1, wherein said pipe member is fixably secured to said mount.

10. The hunting blind of claim 1, wherein said pipe member comprises at least one angled entry hole for receiving said at least one support tube.

11. The hunting blind of claim 1, wherein said at least one support tube is resiliently flexible.

12. The hunting blind of claim 1, further comprising a roof cover.

13. A method of camouflaging comprising the steps of:
   a. obtaining a hunting blind comprising means for securing said hunting blind to a support surface, at least one elongated support frame, said means for securing said hunting blind to a support surface carried by said elongated support frame, said at least one elongated support frame secured substantially horizontal to the support surface via said means for securing said hunting blind, at least one flexible support tube comprising at least one tube segment, wherein said at least one flexible support tube is carried by said at least one elongated support frame, and at least one screen carried by said at least one support tube;
   b. transporting said hunting blind to a selected location;
   c. taking a position in the selected location; and
   d. assembling said hunting, blind, wherein said assembled hunting blind defines a generally straight rear wall, two generally-arcuate and deformable side walls, and a front wall.

14. The method of camouflaging of claim 13, further comprising the step of:
   e. securing said hunting blind to the surface.

15. The method of camouflaging of claim 13, further comprising the step of:
   f. disassembling said hunting blind.

16. The method of camouflaging of claim 13, wherein said at least one support tube is resiliently and releasably forced into a bowed shape.

17. The method of camouflaging of claim 13, wherein said hunting blind further comprises a roof cover.

18. The method of camouflaging of claim 13, wherein said at least one support tube is resiliently flexible.

19. The method of camouflaging of claim 13, wherein said at least one screen has a camouflage pattern thereon.

* * * * *